(12) United States Patent
Sonnenberg et al.

(10) Patent No.: US 9,596,686 B2
(45) Date of Patent: Mar. 14, 2017

(54) BANDWIDTH EFFICIENT WIRELESS SIGNAL TRUNKING SYSTEM AND METHOD

(71) Applicants: John Sonnenberg, Encinitas, CA (US); Adam Hickerson, Oceanside, CA (US)

(72) Inventors: John Sonnenberg, Encinitas, CA (US); Adam Hickerson, Oceanside, CA (US)

(*) Notice: Subject to any disclaimer, the term of this patent is extended or adjusted under 35 U.S.C. 154(b) by 0 days.

(21) Appl. No.: 14/545,837

(22) Filed: Jun. 25, 2015

(65) Prior Publication Data
US 2016/0381683 A1    Dec. 29, 2016

(51) Int. Cl.
*H04W 72/04* (2009.01)
*H04W 4/00* (2009.01)
*H04W 72/00* (2009.01)
*H04W 88/12* (2009.01)

(52) U.S. Cl.
CPC ..... *H04W 72/0453* (2013.01); *H04W 72/005* (2013.01); *H04W 88/12* (2013.01)

(58) Field of Classification Search
None
See application file for complete search history.

(56) References Cited

U.S. PATENT DOCUMENTS

| | | | |
|---|---|---|---|
| 6,457,038 B1 * | 9/2002 | Defosse | G06Q 20/208 700/231 |
| 9,119,219 B2 * | 8/2015 | Zhou | |
| 9,380,442 B2 * | 6/2016 | Turtinen | H04W 8/005 |
| 2012/0019395 A1 * | 1/2012 | Willig | H04Q 9/00 340/870.02 |
| 2014/0269348 A1 * | 9/2014 | Mandiganal | H04W 84/18 370/246 |

* cited by examiner

*Primary Examiner* — Chi H Pham
*Assistant Examiner* — Soon-Dong D Hyun
(74) *Attorney, Agent, or Firm* — John R. Ross; John R. Ross, III

(57) ABSTRACT

A narrowband radio system and method for use in wireless communication systems. Preferred embodiments are designed to provide data communication links between users, referred to as "endpoints". Endpoints in many embodiments include wireless radio modems. In preferred embodiments many or all of these links are two-way data communication links. Endpoints (typically "human users or computer systems") can send data to the radio modems, and the radio modems can send data to the endpoints. In typical systems, the radio modems are connected to machines that are configured to respond to data communication. Computers are programmed with special protocols designed for efficient communication of information through the narrow band channels among users of the wireless trunking system.

33 Claims, 9 Drawing Sheets

Stint with 0 offset, Duration=15, TSI=22, Repeat Duration=9, Repeat Count=0

BANDWIDTH EFFICIENT WIRELESS SIGNAL TRUNKING SYSTEM AND METHOD

CROSS REFERENCE TO RELATED APPLICATIONS

This application claims the benefit of Provisional Patent Application, Ser. No. 62/017,632, filed Jun. 26, 2014.

FIELD OF THE INVENTION

This invention relates to wireless communication trunking system and in particular to such systems configured to operate efficiently with narrow bandwidth data transmissions.

BACKGROUND OF THE INVENTION

Trunked systems in communication networks are well known. Trunked systems allow for efficient use of available bandwidth by multiple users of the network, whereby multiple conversations can be carried over only a few distinct frequencies. Trunked systems are used by many private and government entities using special purpose spectrum allocated to a city, county, public or other dedicated purposes to provide two-way communication for many types of field operations such as construction, fleet operations, fire department deployment, police response and other municipal services.

A trunked radio communications system allows for sharing of relatively few radio frequency channels among a large group of users. When any user in a group wishes to converse with another user, a vacant radio channel assigned to the group is found automatically by the system and the conversation takes place over that open channel. In this manner, multiple unrelated conversations can occur on a single channel, making use of the otherwise idle time between conversations. A control channel is used to coordinate all the communication traffic from the radios on the network. The control channel computer directs packets of data to enable one user group to talk together, regardless of frequency.

There are a number standardized wireless signal packet and modulation protocols and techniques for facilitating communications when there are a large number of system users using a particular trunked network. Such protocols include code division multiple access (CDMA), time division multiple access (TDMA) and frequency division multiple access (FDMA). In these systems, communications between users are conducted through one or more base stations. A first user on one remote device communicates to a second user on a second remote device by transmitting data on the reverse link to a base station. The base station receives the data and can route the data to another base station. The data is transmitted on the forward link of the same base station, or a second base station, to the second remote device. The forward link refers to transmission from the base station to a remote device and the reverse link refers to transmission from the remote device to a base station. In IS-95 systems, the forward link and the reverse link are allocated separate frequencies.

The remote device communicates with at least one base station during a communication. CDMA remote devices are capable of communicating with multiple base stations simultaneously during soft handoff. Soft handoff is the process of establishing a link with a new base station before breaking the link with the previous base station. Soft handoff minimizes the probability of dropped calls. A method and system for providing a communication with a remote station through more than one base station during the soft handoff process are disclosed in U.S. Pat. No. 5,267,261, entitled "MOBILE ASSISTED SOFT HANDOFF IN A CDMA CELLULAR TELEPHONE SYSTEM".

Within current communication networks, there are a number of significant difference between the transmission of voice and data. For an acceptable user experience, voice transmissions require a fixed and common quality of service for all users. Typically, for digital systems providing voice services, this translates into a fixed and equal data transmission rate for all users and a maximum tolerance value for the error rates of the speech frames, independent of the link resource. For the same data rate, a higher allocation of resource is required for users having weaker links. This results in an inefficient use of the available resource. In contrast, for data services, the quality of service can be different from user to user and can be a parameter optimized to increase the overall efficiency transmission within the data communication system. The grade of service for a data communication system is typically defined as the total delay incurred in the transfer of a data message.

Another significant difference between voice services and data services is the fact that the voice imposes stringent and fixed delay requirements. Typically, the overall one-way delay of speech frames must be less than 100 msec. In contrast, the data delay can become a variable parameter used to optimize the efficiency of the data communication system based on the required quality of service. Additionally, the configuration of voice and data transmitted across the network may be significantly different. Most industry standard internet and communication protocols are too cumbersome to use on narrow band data links. They are also complex, for example TCP/W, X.25 or HDLC requires specialized hardware to implement, and again, for the simple micro-controller, the software development required is excessive. Further, current wireless data systems generally require significant wideband capacity to support the extensive voice and data requirements of user. Wideband is also required to provide the control channel functions for tracking and logging activity on user devices. This need for wideband capacity has resulted in a complex network with expensive infrastructure and airtime costs.

In the United States radio communication is regulated by the Federal Communication Commission under its FCC Rules Title 47 Code of Federal Regulations and related rules including FCC Part 22, 15 and 101.

A relatively low-cost communication system designed to use simple micro-controller based devices and optimized for narrow band transmission of voice and data services over narrow-band networks is needed. The present invention provides a channel structure and protocol which facilitate transmissions of data and voice services. Given the growing demand for wireless data applications and the constraints on wireless bandwidth capacity, the need for very efficient wireless data communication systems has become increasingly significant. What is needed is a novel and improved narrowband channel structure and protocol for use in wireless data communication systems.

SUMMARY OF THE INVENTION

Typical Embodiments

The present invention provides a narrowband radio system and method for use in wireless communication systems.

Preferred embodiments are designed to provide data communication links between users, referred to as "endpoints". Endpoints in many embodiments include wireless radio modems. In preferred embodiments many or all of these links are two-way data communication links. Endpoints (typically "human users or computer systems") can send data to the radio modems, and the radio modems can send data to the endpoints. In typical systems, the radio modems are connected to machines that are configured to respond to data communication. A few of the many applications of the present invention are:

GPS tracking. Using a GPS receiver, a radio modem reports the location, speed, heading, and possibly other information regarding a vehicle.

Meter reading. The modem can be connected to a gas, water, or power meter, and the readings in the meter communicated back to one or more endpoints.

Vending machine control. Radio modems inform users of inventory and other information regarding the vending machines.

Alarm System. The modem could be connected to a burglar alarm or fire alarm, and when the alarm is triggered or must report status, the modem can send the alarm information to an endpoint. A computer monitoring system can periodically poll the alarm system through the wireless data to verify the alarm system is functional.

Just some of the many other applications this technology can be used for are:

Remote control of lighting, irrigation systems, and power.
Home automation.
Mobile data communications with vehicles and text displays in vehicles.
Personal communications, such as text messaging from wireless display devices.
Street sign text updating.
Wirelessly updating advertising displays.
Remote traffic monitoring.
Communicating with weather stations.
Positive train control.
Delivery service dispatch, tracking, updating, and communication.
Public safety officer and responder dispatch, monitoring, and GPS tracking.
Fire fighter tracking and emergency detection.
Theft detection of assets.
Tracking rental equipment for activity, theft, and usage.
Monitoring water tanks and water distribution systems.
Monitoring electricity and gas distribution systems.
Oil field supervision, control, and data acquisition. In-plant communications between machines and sensors in large industrial facilities.
Nurse-call systems to alert care-givers of personal care and critical needs.

Preferred embodiments of the present invention include a large number of base stations. Applicants' customers' networks include up to 2,000, but some networks have as one or two base stations, and this invention can support networks of more than 10,000 base stations. The base stations are typically located near tall radio towers or hill-tops. For best radio coverage, the antennas connected to the base stations should be located as high as possible above the average terrain. Base stations in accordance with the present invention have much better radio coverage than typical base station serving devices such as cell phones which operate on frequencies using bandwidths in the range of 200 kHz to 4,000 kHz. Applicants' base station uses "narrow-band" data radio channels that are preferably 12.5 kHz to 50 kHz wide. These narrow-band channels require licensing from regulatory agencies, such as the FCC. They cannot be used unless a license is obtained, which can cost a substantial amount of money so using the bandwidth efficiently is very important. Regulatory agencies allow high-power RF transmissions on narrow-band channels so a single base station according to the present invention will cover 10-1000 times the area covered by a typical 4G cellular base station or a typical WiFi hot-spot. The technical reasons that narrow-band radio systems having such a large coverage advantage are:

Slow data rates. Data must be sent very slowly to meet regulatory requirements on narrow-channels. But slow data travels much farther. A 9600 baud signal will be receivable 10-50 times farther than a similar transmission running at 1 mega-baud per second.

High power. Regulatory agencies allow high-power transmissions on narrow-band channels, so operators can potentially use 100 to 1000 watt transmitters where broad-band channels are normally very power limited to a few watts or even milliwatts.

Many RF channels. Because they are narrow, a narrow-band radio system can have from one to dozens of radio communications taking place at the same time. Trunking technology such as global System for Moble (GSM) has been used for many years on voice radio systems, and DART implements conventional trunking techniques to enable billions of endpoint devices to share thousands of radio channels. For example, in the 896 MHz frequency band often used for commercial wireless communications, there are 400 uplink channels and 400 downlink channels. Reusing these 800 channels every 50 to 100 miles across a state or country will allow many thousands of data communications to take places simultaneously.

A radio communication network built utilizing narrow-band radio channels may be more economical because it will need 10-times fewer base stations than a broad-band network. But because the bandwidth is limited over-the-air, a narrow-band network cannot pass as much data as a broad-band network. Preferred protocols were developed by Applicants to greatly improve the efficiency of a large wireless network, thus making narrow-band data networks an economical and viable option for many wireless needs. These protocols have been given the names: DART and HYPER and they have been specifically described in the section with the title Detailed Description of Preferred Embodiments.

Specifically as claimed in the appended claims the present invention includes a trunking system and method in which there is at least one base station with at least one antenna, at least one radio transceiver system adapted operate at plurality of center radio frequencies in the range of 200 kHz to 4,000 MHz and to transmit and receive radio signals within a plurality of narrow band channels that are each no wider than 50 KHz. The base station or stations also include a base station controller having at least one base station computer. Embodiments also include a plurality information collecting modems, each of the plurality of information collecting modems having a factory installed device node address. The modems also include a plurality of wireless transceiver units each comprising an information collecting unit central processing unit and adapted to communicate wirelessly with the at least one base station at plurality of center radio frequencies in the range of 200 kHz to 4,000 MHz and to transmit and receive radio signals within a plurality of narrow band channels that are each no wider than 50 KHz and a central processing unit for processing and storing at least temporally a portion of the collected information. The embodiments also include a master communication facility comprising a master computer system in communication with the at least one base station through a network connection and programmed to read and record information accumulated by the central processing units in the plurality of wireless transceiver units and the facility is also in communication one or more users of information accumulated by the central processing units in the plurality of wireless transceiver units. The master computer system, the at least one base station computer and the information collecting unit central processing unit are all programmed with special protocols designed for efficient communication of information through the narrow band channels among users of the wireless trunking system, the protocols being adapted to permit users to assign a user node identification addresses to each of said wireless transceiver units requiring smaller header packets than the factory installed device node addresses, to provide node zero addressing in which a blank field in address packets are interpreted as zero thus reducing sizes of the address packets, and to permit the base station computer to designate time allocations to the information collecting units specifying how and when the information collecting units are to transmit information to the base stations.

DETAILED DESCRIPTION OF PREFERRED EMBODIMENTS

A Dart Network

Figure 1:
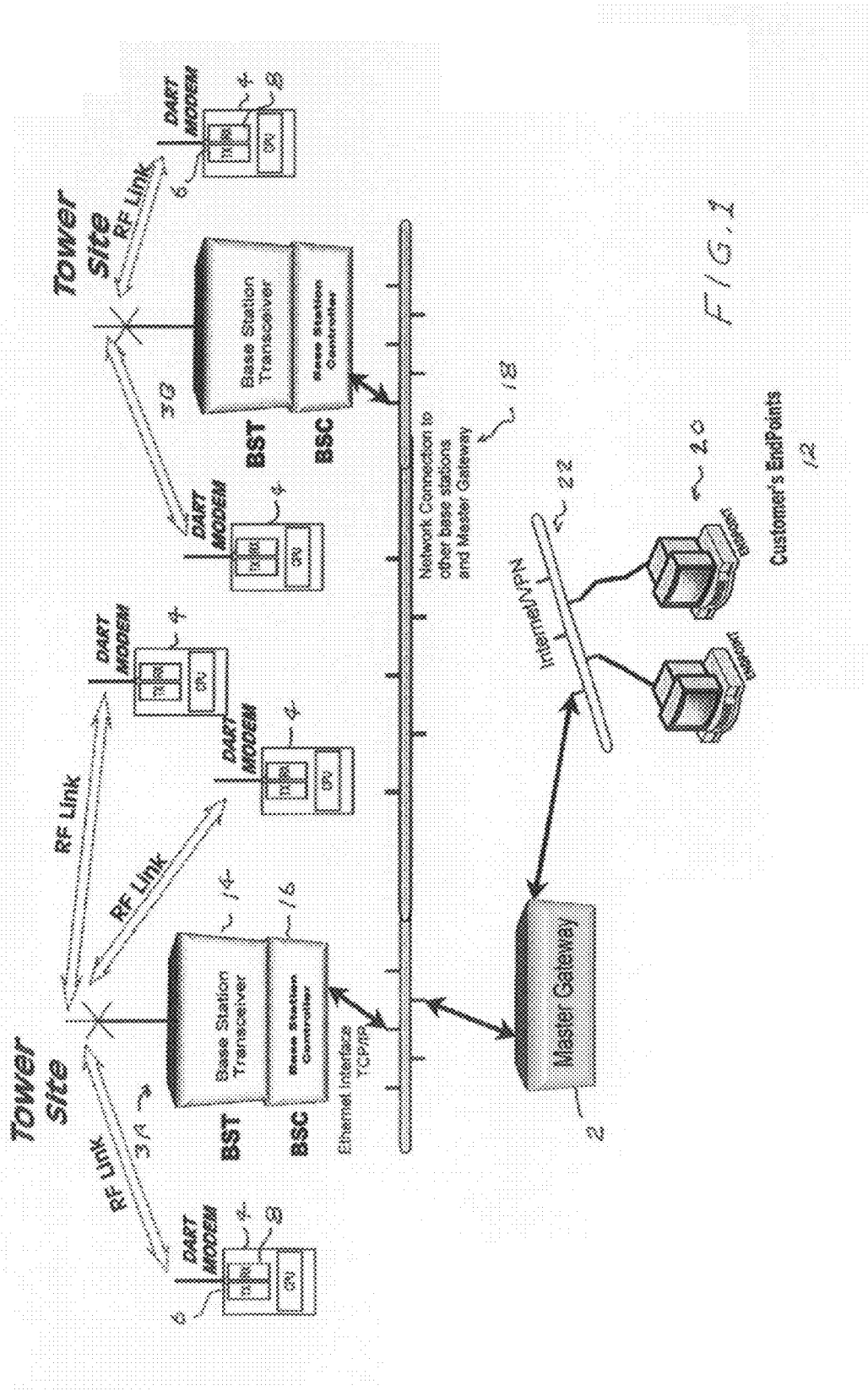
FIG. 1 Is a top level system overview of a preferred embodiment of the present invention.
Figure 2:
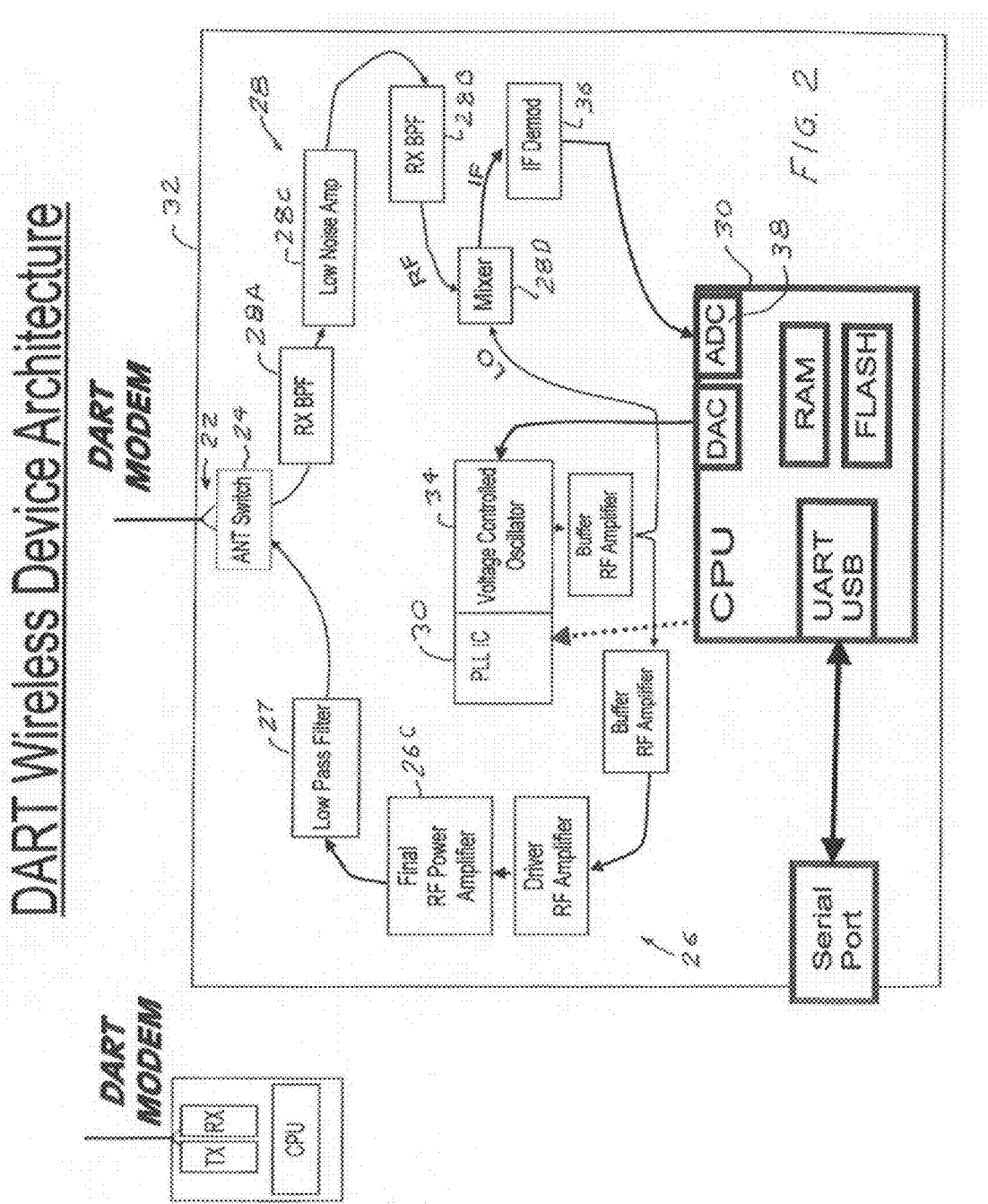
FIG. 2 describes the wireless device architecture of a preferred embodiment that Applicant's have named DART.
Figure 3:
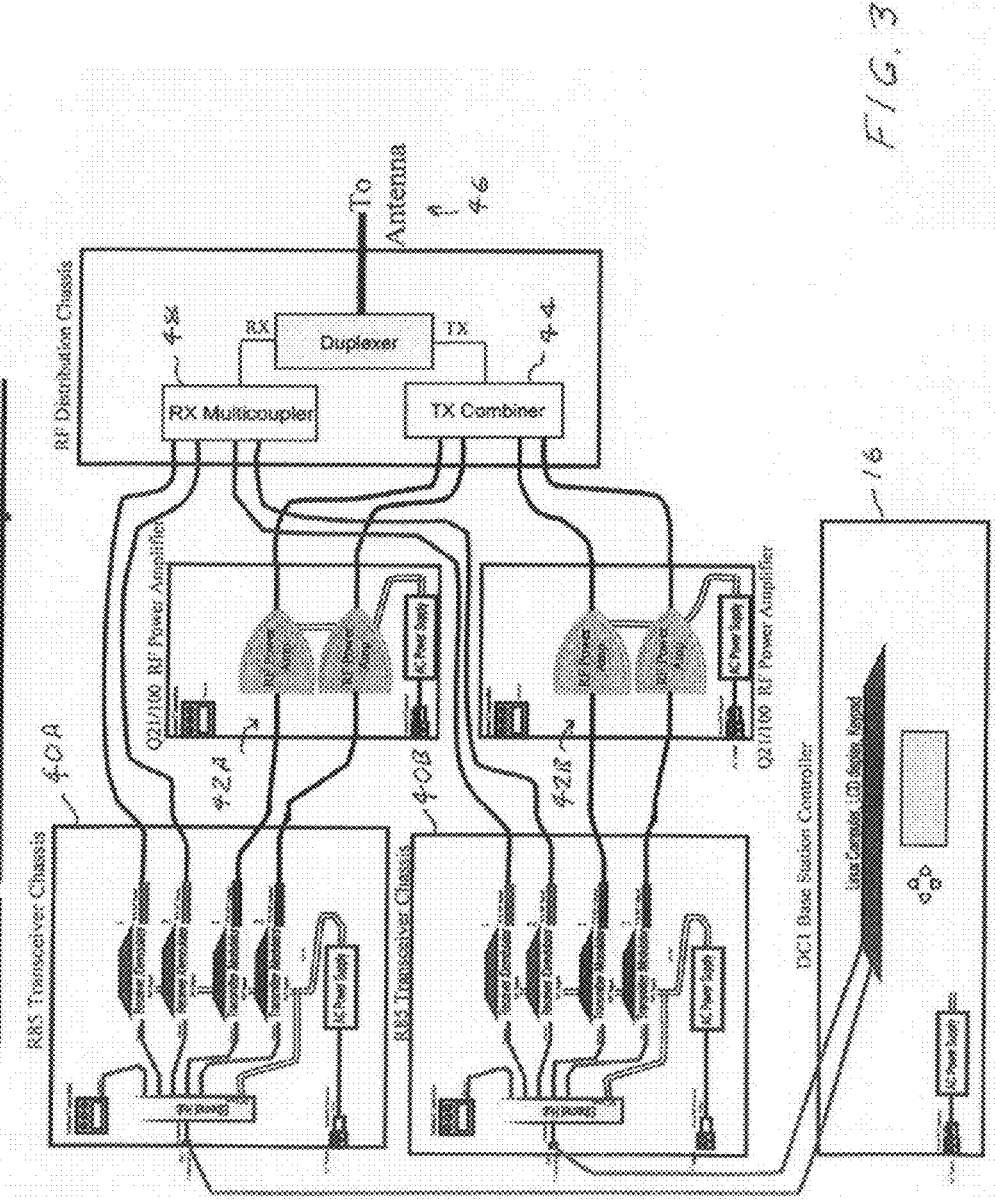
FIG. 3 shows the principal components at a DART base station.

A preferred embodiment of the present invention (that Applicants call their "DART network") is described in FIGS. 1, 2 and 3. For example the customer could be an electric power company that needs to connect their customer's power meter to the power company's offices shown at 2 and called 'Master Gateway" in FIG. 1. A DART Modem 4 is located at each power meter. Each DART modem 4 comprises a transmitter 6 shown as "TX" and a receiver 8 shown as "RX" for communicating via one or more base stations 8 with the power company's offices 2. Each modem also includes its own central processing unit (CPU) 10 which in turn is connected to the power company's customer's power meter (not shown). A master computer (not show) is located at the power company's offices and is programmed to automatically read and record data accumulated by the computer processors units 10 in the DART modems 4. All DART modems have some type of serial data interface such as RS-232, Ethernet, or USB. Each modem 4 is assigned a Local Node Address (LNA) identification code by a base station controller (BSC) 16. Once the meter is connected to the DART modem, the data in the meter can be transmitted to the utility company's computer system, shown connected to the Master Gateway via the Internet or a virtual private network (VPN) as the "Customer's EndPoints" 12 in the diagram. Dart modems communicate through RF links to one of several base stations shown as 3A and 3B in FIG. 1. The base stations may be connected to each other and to the Master Gateway through a high data rate trunkline connection 18 which may include cable, microwave, Internet or other high data rate network type communication facilities. The DART system supports user-configurable identification (ID) codes for any DART modem, so a utility company can assign their unique identifier (UNID) to each DART modem they own.

The sequence of events that will occur when the meter sends its reading to an endpoint is:

1. The DART modem is typically sleeping but is programmed to power on periodically, such as once per week or once per month.
   a. It scans its frequency tables looking to find a signal from a local base station.
   b. The DART modem sends a request to join the network.
   c. A Base Station Transceiver (BST) 14 receives the request from the DART modem to join the network.
   d. The BST passes the request to its local Base Station Controller (BSC) 16.
   e. The BSC passes the request via a local area network (LAN) 18 to the master computer in MG 2.
   f. The master computer in Master Gateway 2 looks up the identification of the DART modem to determine if it is allowed on the network, what security scheme to use, the allowed quality of service, and how the DART modem should be configured.
   g. The master computer then passes this information back to the base station controller (BSC).
   h. The BSC constructs a response message for the DART modem that will authorize the DART modem to be on the network. The BSC also determines which radio frequency channel the particular DART modem should be trunked to.
   i. The response message is passed to the base station transceiver (BST) 14 to be transmitted over the air back to the DART modem.
   j. After the DART modem receives the authentication and authorization message, it configures itself as required and gets ready to communicate. It has been assigned a Local Node Address (LNA) identification code by the BSC to use every time it wants to communicate with the Base Station System.
   k. An LED on the modem begins blinking green indicating the successful authentication.
2. The utility meter sends its reading out a serial port, to a DART modem's serial port.
3. The DART modem's central processing unit (CPU) determines the amount of data to be transmitted,
4. The DART modem transmits a request to the BST asking for permission to send the data. If the channel is not busy and the data is short, it may just go ahead and send the data on the radio channel it was assigned.
5. The BST receives the data request and passes it to the BST. The BST determines which RF channel is the best one to use given the amount of data needed to be sent. It computes the best time to send the data based on the activity of other modems. The time allocation is put into a format Applicants call a "Stint" to determine the length and time of the proposed transmission. This Stint value is a HYPER packet header is constructed in two portions as described below and has as its purpose to limit the size to the message transmitted to conserve bandwidth.

6. The data authorization and the stint value is passed from the BSC to the BST.
7. The BST transmits the data transmission approval message over the air along with the stint value and the channel to use for the transmission.
8. The DART modem receives the data approval, changes to the approved radio channel.
9. When stint time occurs, the DART modem keys its transmitter and transmits the meter reading data over the air to the BST using encryption and configuration settings assigned during authentication.
10. The BST receives the data message and passes it to the BSC.
11. When the BSC receives the message, it tells the BST to transmit an acknowledgement message back to the DART modem
12. The BSC replaces the assigned LNA identification with the actual identification of the DART modem and then passes the meter reading data message to the Master Gateway over the local network. The local network is typically a secure virtual private network (VPN) that privately interconnects the various radio towers and the Master Gateway utilizing portions of public networks.
13. When the master computer at Master Gateway 2 at the power company receives the meter reading data, it looks up (in a pre-configured router table) the identification of the DART modem that sent the data.
14. After analyzing the pre-configured routing table, the meter data message is routed to the appropriate IP port, IP address, or serial port as determined by entries in the master computer's router table. The router table will have entries that tell the master computer how to route the data from all the DART modems owned by the particular utility company to the utility company's system management servers.
    a. The utility company could have the master computer in the Master Gateway 2 configured to route DART modem data to a number of endpoints 20 via the virtual private network 22 based the endpoints identifications, or some other criteria.
    b. The identifications transported with the meter data message to the utility company is the unique identifier UNID ID for the DART modem that has been assigned to the particular DART modem on that meter.
    c. In certain situations the server computer may also be configured to log the data into a database.
15. If the utility company's endpoint wishes to send a response to the meter that sent this data, the endpoint could pass a response message back to the Master Gateway.
16. If the MG is given a response, it will look up the identification of BSC that is currently communicating with the desired DART modem.
17. The MG passes the response to the appropriate has station controller BSC.
18. The BSC that gets the response will look-up which radio channel the DART modem is currently listening on, compute a stint that is free, and then pass the response message to the BST.
19. The BST waits for the stint time to arrive, keys its appropriate radio transmitter, and send the response message to the DART modem using the LNA that it assigned that modem.
20. The DART modem receives the response, decrypts it if needed, and outputs the data via its serial port.
21. The DART modem also sends an acknowledgement message immediately back to the BST to inform the BSC that the message was delivered.

DART Innovations

Obviously data communications of the general type described above have been going on for many years, but the way it is implemented in DART makes the system so much more efficient, secure, and reliable. To perform the above communication example, the following DART related concepts are utilized.

Identification Schemes and Bandwidth Conservation

Each DART modem in a DART network may have up to three different IDs at any given time. A fixed Device Node Address (DNA) built-in at the factory, and Local Node Address (LNA) dynamically assigned during authentication as described above, and a unique identifier (UNID) assigned by the user (the power company in the above example). An advantage of this dynamic addressing scheme is that users of a DART system can assign whatever ID they wish to use to each of their devices. The innovations described hide all of the sophisticated addressing and bandwidth compression innovations from the user. From the user's perspective, it just works with the ID they assigned to their wireless device.

HYPER Dynamic Length Fields

The HYPER packet header is constructed in two portions. The first is a 21-bit static header containing information that must be sent with all packets. The second is four dynamically sized fields. By making the header portion very dynamic, over-the-air bandwidth is reduced, bit-error-rates reduced, and latency reduced.

ID Re-Assignment to Reduce Network Bandwidth

HYPER packets require fewer bytes to be transmitted as the number of leading 0s increases for the dynamic fields. Thus, lower numbered IDs produce smaller packets. DART uses an ID re-assignment scheme during the radio authorization stage, choosing the most efficient ID available every time a radio authenticates.

"Node 0" Default Addressing

Internally, the DART network uses rewrite/multicast rule tables to route data. This allows the network to internally change the source and destination addresses of messages as they enter and then route based on the new addresses. In the HYPER protocol, a blank field is interpreted as a 0 address. With the blank ID provision in HYPER and rewrite rules applied the DART network bandwidth is highly conserved if ID 0 is used for the most common communication path in the rewrite rules.

UNIDs and End-to-End Routing

Since data can only be sent between members of a DART network (referred to as the "NET") and all sources of data are known by the DART network, it is possible to assign IDs to each member of the network that is unique for the NET and generally part of a smaller address space than the full DNA address space. These network-unique IDs are known as User Node Identifications (UNIDs). Users of a DART system could assign IP address to the DART modems, or assign their own addresses such as using the meter ID to be the DART modem ID.

A user interface to the Master Gateway lets DART network users manage the ID s they assign to their DART modems.

Group ID Re-Assignment

Reduces Network Bandwidth and Eliminate Address Space Collisions

The HYPER packet headers use the same source (SRC) and destination (DST) fields whether a group multicast or a regular unicast message is being sent. This saves bandwidth as no separate field or field identifier is required to identify an address as a group address. To facilitate sending either a Group address or a Node address in these fields, the BSC assigns each Group a LNA address (in addition to the LNA address assigned to the WD). When another DART modem that is a member of the same group authenticates on the same base station, it is given the same group LNA so that one message may be sent that will be received by all DART modems that are a member of the group.

TDMA without Fixed Slotting

Traditional repetitive time division multiple access (TDMA) schemes use repeating slots which are scaled to fit at least one whole message and optimized for voice transmission. However, much of the bandwidth savings of DART and HYPER is measured in bytes within a message, rather than whole messages. By precisely allocating a "Stint" of time that is dynamically optimized for the data message needs at the time, precious narrow-band RF bandwidth is conserved and message reliability improved. Unlike traditional voice systems where the time allocation is two parameters 1) slot time and 2) repetition rate, the DART time "Stint" allocation is:
1) absolute start time,
2) initial time allocation,
3) repetitive allocation time,
4) repetition rate,
5) maximum number of repeated allocations, and
6) RF channel allocation.

Downlink Data Specifying Pre-Assigned Response Time

Since the DART protocol specifies a number of messages sent from the BSC which require a response by the DART modem, these messages include an embedded bandwidth assignment. The bandwidth assignment is used by the Dart modem to transmit its response to the BSC.

Changing Interleaving Schemes to Prevent Inter-Modulation Reception

Inter-modulation and other false-reception scenarios present slight problem for all radio networks. Under certain scenarios, it is possible to successfully receive a message sent on one channel in another, particularly when there are a large number of channels in the same area. False receptions are unacceptable in a modem radio network and could present a particular problem in a DART network because of the extensive use of ID-reassignment. By utilizing a different bit-interleaving scheme on each base station site, adjacent base stations cannot accidentally decode messages sent to nearby sites.

Implementing a DART Modem

A DART modem is any wireless device programmed to function with the DART protocol and the HYPER protocol It is a data radio modem with a powerful CPU that implements the DART protocol and the HYPER protocol. HYPER is a MAC-layer protocol designed to send data bits over a radio channel. DART is the packet protocol running on top of HYPER. Both can be implemented in the same CPU in the DART modem.

FIG. 2 provides and an overview of a typical DART modem. The primary technology sections of these wireless devices are:
1. Antenna connection 22, typically a BNC, TNC, SMA, or N type connector.
2. An antenna switch 24 typically a PIN-diode switch or an integrated semiconductor such as a MaCOM (Lowell, Mass.) part number MASW-007921.
3. A RF transmitter 26 comprised of a series of RF power amplifiers 26A, 26B, and 26C.
4. An RF receiver 28 comprised of a series of RF filters, for example 28A and 28B, amplifiers 28C, and mixers 28D.
5. A CPU microprocessor 30 capable of digital signal processing, implementing the DART and HYPER protocols, and a flexible user interface.
6. A number of DC voltage regulators designed to allow the DART modem to operate from a wide range of DC input voltages.
7. A metal enclosure 32 to provide RF shielding and make the device rugged.

RF Transmitter

Connected to the antenna switch is a low-pass filter (LPF) 27 that passes the transmit RF signal and attenuates harmonic output from the transmitter amplifier circuits. The "Final RF Power Amplifier" 26C is a powerful RF amplifier semiconductor typically capable of 3-25 watts of RF. A CREE (Durham, N.C.) CGH40006S transistor is a good choice for final RF power amplifiers in the 500-5000 MHz range. The RF power amplifier 26B is driven by a simpler and lower-cost driver transistor putting out about 100 mW of RF power. The transmit RF carrier is generated by a voltage controlled Oscillator (VCO) 34. When transmitting, the VCO runs at the transmit frequency. The CPU programs a phase locked loop (PLL) chip to phase-lock the VCO to the correct transmit frequency. A PLL IC such as LTC6948 made by LinearTech (Milpitas, Calif.) can be programmed to lock a VCO. A digital to analog converter (DAC) in the CPU outputs the actual FM modulation signal to apply to the VCO. When the DART modem needs to transmits, the CPU enables the VCO, programs the PLL to the transmit frequency, and turns on the RF power amplifier's voltage regulator. Once the RF power amplifier is at full power, a DART message in the HYPER format is frequency modulated using the VCO's frequency modulation (FM) port.

DART and HYPER are designed to work using either 2-level frequency shift keying (FSK) modulation or 4-level FSK modulation.

RF Receiver

Connected to the antenna switch is also a band-pass filter (BPF) 29 for the receiver. The antenna switch 24 is controlled by the CPU 30. When the DART modem is in the receive mode, the CPU switches the antenna switch to connect the antenna input port to the receive band pass filter (RX BPF) 28A. After the first BPF, the receive signal is amplified by a low-noise RF amplifier (LNA) 28C such as a NXP (San Jose, Calif.) IC part number BGU6101. After the LNA, the receive RF signal is again filtered by another band-pass filter 28B to pass only the desired receive band. The VCO 34 in the receive mode is re-programmed to be the receive local oscillator. The mixer down-converts the radio frequency RF to an intermediate frequency (IF) as needed by the input of the IF demodulator chip 36. The IF demodulation chip typically requires an RF input of about 45 MHz. The IF demodulation chip 36 demodulates the IF signal and sends the base-band demodulated signal to the CPU's Analog-to-digital (ADC) input 38.

Central Processing Unit

The central processing unit (CPU) 30 is the heart of the DART modem. It controls all timing, protocols, radio operation, and frequency settings. Some preferred implementations may use two or three CPUs, or a power CPU such as the ST Micro (Santa Clara, Calif.) IC part number STM32F215 can do all DART, HYPER, user interface, and system control functions.

The CPU has firmware in it to do at least these functions:
1. Implement DART protocol
2. Implement the HYPER protocol.
3. Control the PLL and program it
4. Control the RF power amplifier ramp-up/down time to meet regulatory requirements.
5. Do the forward error correction (FEC). DART uses the well-known LDPC algorithm for FEC to reduce over-the-air bit errors.
6: Perform encryption and decryption. DART uses AES 128 and 256 bit encryption.
7. Implement a command-line interface to configure the DART modem. A typical DART modem will have 50 to 100 commands to configure options, IDS, calibration, and features.
8. Hand the serial data in/out to and from the user's serial port, be it USB, Ethernet, RS232 or some other protocol. The ST Micro CPU (that can be provided at 30) supports them all.

Typical Transceiver Specifications

Typical specifications for DART modem and other wireless transceiver modems that would perform well on a DART system are:
Specifications:
General
    Model Number, transceiver: . . . (such as RV-M80)
    RF Power Output . . . 1.0 W-5.0 W (programmable)
    IF Bandwidth . . . 12.5 kHz standard, 25 kHz optional (–W)
    Serial Port Baud Rates . . . 1.2 k, 2.4 k, 4.8 k, 9.6 k, 19.2 k, 38.4 k, 57.6 k, 115.2 k
    Over-the-air baud rates . . . 1200, 2400, 4800, 9600
    Operating Mode . . . DART over-the-air protocol
    Full Spec Operating Temperature range . . . –30° C. to +60° C.
    Wake-up time . . . <700 mS from OFF
    RF I/O Connector . . . MMCX female
    Enable Input Low . . . 400 mV
    Digital Output High (1K load) . . . 3.0-3.3V
    Digital Output Low (1K load) . . . 0-0.2V
    Digital Input High . . . >3.0V
    Digital Input Low . . . <0.3V
    Enable input High . . . 1.40V
Transmitter Specifications (M80-xx)
    RF Power Output . . . 1 W-5 W (programmable)
    Frequency Range (–EB) . . . 896-901 MHz
    Frequency Range (–TB) . . . 935-940 MHz
    Maximum Duty Cycle (1 W) . . . 50% to 40 C, 20% to 60 C
    Maximum Duty Cycle (5 W, measured over 60 seconds) . . . 10% to 50 C, 5% to 60 C
    Frequency Deviation . . . ±2.2 kHz
    Channel spacing . . . 12.5 kHz
    TX Spurious outputs . . . <–70 dBc
    Occupied Bandwidth . . . Per FCC
    FCC Emissions Designator . . . 11K0F1D
    Frequency Stability . . . Better than ±1.0 ppm
Receiver Specifications
    Frequency Range (–EB) . . . 935-940 MHz
    Frequency Range (–RB) . . . 896-901 MHz
    Data RX sensitivity (0.1% BER), 19200 bps Wideband . . . <–110 dBm
    Data RX sensitivity (0.1% BER), 9600 bps Narrowband . . . <–110 dBm
    Data RX sensitivity (0.1% BER), 1200 bps . . . <–116 dBm
    Current Consumption . . . <120 mA at 12.5V DC input
    Channel spacing . . . 12.5 kHz or 25 kHz (–N or –N)
    Adjacent Channel Selectivity . . . 12.5 kHz –50 dB
    Alternate Channel Selectivity . . . –60 dB
    Blocking and spurious rejection . . . –70 dB
    RX intermodulation rejection . . . –70 dB
1.1 Interface Specifications
    DC Input
    Connector on front panel . . . 3-pin M8 type
    Serial Port
    Serial connector type . . . DB9 RS 232 serial
    IO Voltage Levels . . . RS232
    RX and TX data . . . Transparent Async
    Word length . . . 8 bits
    Format . . . N, O, or Even parity, 1 stop
    Other
    RF connector . . . TNC Female

Base Station System

A preferred DART base station is comprised of a number of radio transmitters, radio receivers, radio frequency distribution hardware and a Linus based Base Station Controller (BSC). This BSS system is typically built in a 19" rack-mountable chassis. The radio transmitters and radio receivers can be the DART Wireless Devices with base-station firmware in them. Typically they are special-built base-station class radio designs with higher-performance components.

FIG. 3 is a block diagram of a DART BSS diagram illustrating a 4-channel base station. A base station may have any number of channels from 1 channel or 100 channels or more depending upon the system needs. In this example of four channels, there are two radio chassis 40 A and 40B, each radio chassis holds 4 receiver modules and 4 transmitter modules. All 8 modules communicate with the base station controller BSC 16 using an Ethernet hub or an 8-port terminal server such as a MOXA (with offices in Brea, Calif.) NPort 5600-8-DT. The output of the 4 RF amplifiers goes to the input of high-power high-duty-cycle RF power amplifiers 42A and 42B. These amplifiers amplify the transmit RF to levels of 25-1000 watts depending upon the system needs. The output of the RF power amplifiers is feed into a multi-coupler 44 that combines all RF channels/carriers into one signal to be connected to the site's antenna as shown at 46. EMR Corporation (Phoenix, Ariz.) makes standard and custom RF combiners and distribution hardware for narrow-band radio systems. The site's antenna is also connected to a receiver multicoupler 48 that filters off the TX signal, amplifies the RX RF signal, and splits it into for separate signals for the four receivers.

Important Applications of the Present Invention

Described below in detail are three of the most important applications of the present invention: meter reading GPS tracking and vending machine control. Other applications are also described below but in less detail.

Meter Reading Using DART and HYPER Technology

The advantages of the present invention become apparent with the description of how to implement this invention in a real-world application such as meter reading. Electronic meter reading is very important in the utility business, both for gauging the use of power, gas, and water as well as monitoring a utility's distribution system. Millions of meters are used to measure the usages, flow, and operation of a resource, and wirelessly communicating with meters is a goal most utility providers have. Communication range, bandwidth availability, and product cost and size often limit their ability to use wireless connectivity.

Figure 4:
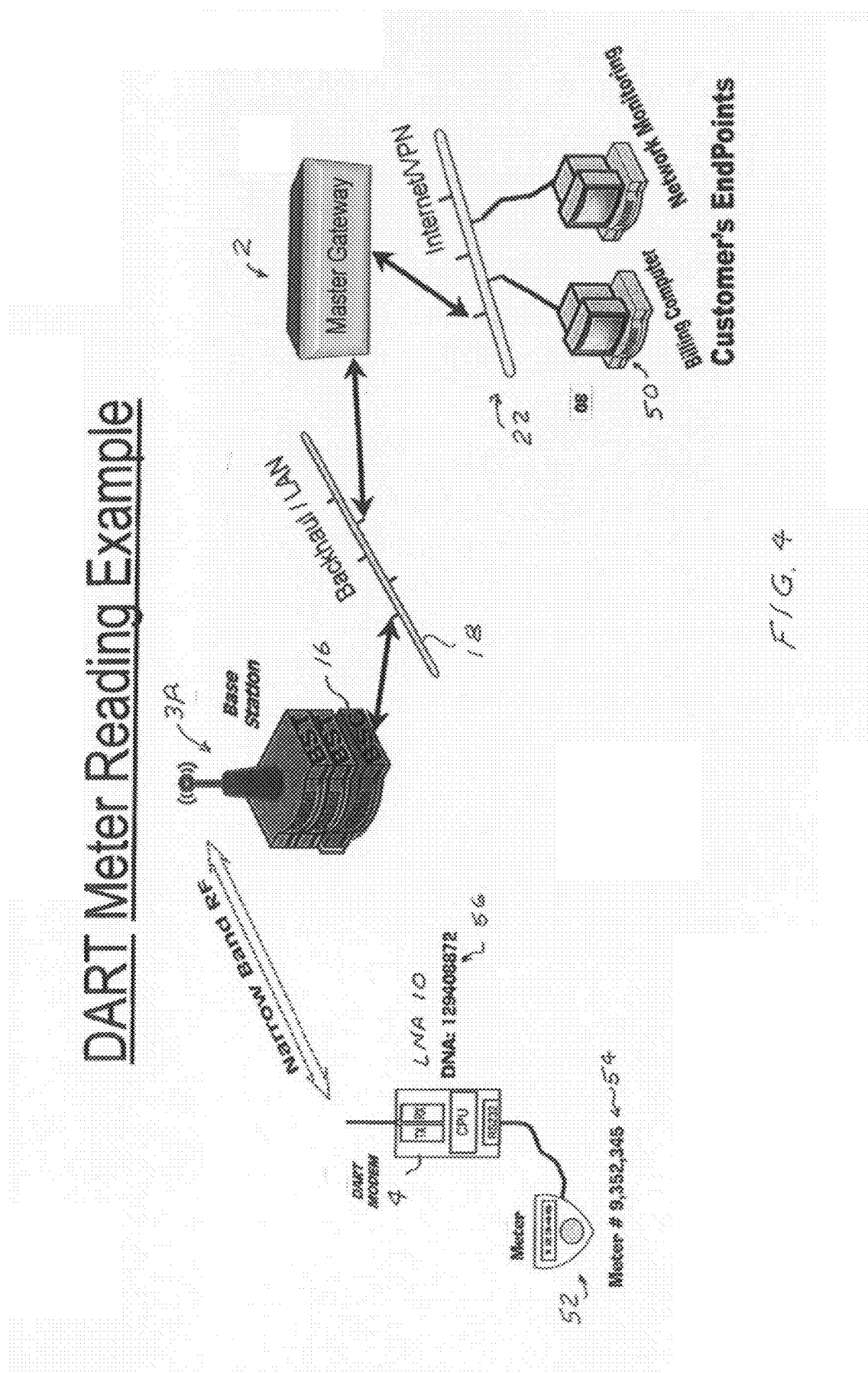
FIG. 4 describes a meter reading embodiment of the present invention.

The "DART Meter Reading Example", diagram FIG. 4, illustrates how a wireless system utilizing DART inventions would operate. The Utilities billing computer 50 communicates to the Master Gateway 2 via a LAN, the Internet, or a VPN. In this embodiment the communication is via an IntemetNAN 22 route. In this embodiment the present invention the computer 50 will log readings from the meters within the Utilities system. In a real system, there will be thousands or millions of meters. Each meter is normally assigned an identification code by the utility company. In this example, the utility assigned the meter 52 identification number 9,352,345 as indicated at 54 because that is the account number for the home in which this meter was located. Applicants refer to this identification number assigned by the user as the "User Node Identification" (UNID). The meter is connected via a common RS232 serial connection to a DART Modem 4 which, as explained above is a radio modem running DART and HYPER radio protocols as described above.

Because the manufacturer of the DART modems may be producing millions of radio modems and a system may utilize millions of the modems, each DART modem needs a unique identifier. The applicant refers the unique ID programmed into every DART modem as its "Device Node Address" (DNA). To facilitate large systems, DART supports DNAs as large as 42 bits, allowing up to 4,398,046, 511,104 unique DNA addresses. IN this example, the DNA is 129408872 as indicated at 56.

The DART and HYPER over-the-air wireless protocol uses the DART modem DNA to identify the source and destination of wireless messages. Over-the-air and at the base stations, the customer's ID code assigned to the meter will not matter because the Master Gateway 2 maps the customer's assigned UNID to the DART modem DNA that the customer's meter is connected to. So for in this example, the router table within the Master Gateway knows that when the utility company wishes to send or receive a message to meter 9,352,345, it must route the data to/from DART modem 129408872. DART implements this in a totally transparent way, so that the utility company does not have to worry about this translation when communicating with their meters.

There are three important innovations in the present invention that allows communicating with a DART modem having such as large DNA to be very efficient:

1) Dynamic Octet Packing. Narrow-band radio channels are often running at 9600 baud, so if no innovation was used to transmit the ID, it would take 4.3 milliseconds just to transmit the identification field. And with forward error correction, that will expand out to 5.6 ms of air time. The HYPER protocol has built into it the invention of leading zero compression. Numbers to be transmitted over-the-air are dynamically octet packed. Dynamic octet packing is done in software by analyzing the number to be transmitted, removing leading zeros, and packing it into a bit-structure that can be unpacked upon reception and returned back to its original binary value. No accuracy or resolution is lost when using dynamic octet packing. A large DNA such as 129408872 is actually 00007B69F68 in binary hex format. Whenever the DNA number needs to be transmitted over the air, regardless of the size, leading zeros are not transmitted over the air. Only the bits necessary to convey the number are sent, so in this example, whenever the DNA must be transmitted it will be sent as 7B69F68 instead of 00007B69F68 which would take 2.9 ms instead of 4.3 ms, a 33% improvement in efficiency and bandwidth conservation.

2) Dynamic Assignment of LNA. The second innovation used in combination with the binary field compression is the dynamic assignment of a Local Node Address (LNA) to each Wireless Device whenever the DART modem authenticates onto the DART wireless network. As part of the authentication process when every DART modem requests approval to join the network, the Base Station Controller (BSC) 16 will assign the DART modem a LNA to use instead of its long DNA. The units are chosen to be bandwidth efficient and easily compressed. So for this example the DART modem with DNA 129408872 is assigned a LNA of 10 when it joined the DART network. Once it is authorized to be on the network, all communication from the particular base station (03) to the DART modem with the DNA 129408827 will use the dynamically assigned LNA of 10 instead of the long DNA. The BSC contains a table of every DART modem it is communicating with, and the table contains the DNA and the corresponding LNA. Over the air, when the BSC must send a message to DART modem with DNA 129408872, it only needs to specify the Local Node Address (LNA) of 10 because both the BSC and the DART modem know that the LNA 10 is assigned to the specific DART modem. A small LNA such as 10 can be transmitted in 8 bits of over-the-air data taking 0.83 ms which is 80% more efficient that sending the complete DNA which is what traditional over-the-air protocols do.

3) HYPER packing header. The third innovation is to use a special compression technique that Applicants call HYPER. Advanced communication protocols such as DART and HYPER have many fields of information embedded in them. HYPER is a MAC-layer protocol used in the DART systems. The dynamic-length fields are the packet-length, source identification, destination identification, and message sequence number. By compressing all of these fields using dynamic octet packing, much over-the-air bandwidth is conserved.

The HYPER packet header is constructed in two portions. The first is a 21-bit static header containing information that must be sent with all packets. The second is four dynamically sized fields:

Packet Length (length), in bytes. May use up to two octets in the packet header. In addition to being dynamically sized, this field may be omitted entirely. Whether the field is included or not is determined by the Frame Type, with a number of frames having fixed length and thus not needing to send a length at all.

Source Identification (SRC). May use up to 8 octets. May be omitted entirely under a few special cases. Whether the SRC field is omitted is indicated by a single bit in the packet header.

Destination Identification (DST). May use up to 8 octets. May be omitted entirely under a few special cases. Whether the DST field is omitted is indicated by a single bit in the packet header.

Sequence Number (SEQ). May use up to 2 octets. May be omitted entirely under a few special cases. Whether the SEQ field is omitted is indicated by a single bit in the packet header.

The dynamic fields are packed using the dynamic octet packing scheme. Data is packed in octets 7 bits at a time, with the first bit of the octet indicating whether the field continues into the next octet for example: [1][ ][ ][ ][ ][ ][ ][ ]. If the upper bit is a 1, as in this example, then the next octet contains additional bits of the field. The bits are sent MSB-first so that when received additional bits are shifted in to the lower 7 bit positions of the field. With this scheme, any leading 7-bit dynamic sequences that are entirely 0 do not need to be included in the header at all, since they do not modify any information about the packet. For example, if the highest bit set in a 42-bit field is between bit 14 and bit 20 (with bit numbering starting at 0 for the LSB) then only 3 octets are required to send the full 42-bit number, since only the first 21 bits will be sent and the rest will be implied to be 0.

For in this example, here is the sequence of events that modify, compress, and expand the meter 9,352,345's identification so that it is transmitted in an efficient way, but also work seamlessly simple from the users (of the utility company in this case) perspective.

1. Meter 52 identified as Meter number 9,352,345 sends a data message into the DART modem 4 with DNA 129408872 indicating its current reading value.
2. The DART Modem 12408872 was assigned a LNA 10, so it sends the data to the base station 3 indicating it was from radio 10.
3. The base station controller at the base station 3 receives the message and sees it is from a DART Modem 10. The BSC looks in its LNA table and determines the data actually came from a DART Modem with DNA 129408872.
4. It passes the meter reading data on to the Master Gateway 2, telling the Master Gateway that the meter data came from modem 129408872.
5. A server computer (not shown) in Master Gateway 2 receives the message from the base station 4 and looks up the user of modem 129408872.
6. The computer in Master Gateway 2 sees that the Dart Modem 129408872 is owned by the utility company with billing computer 8 and monitoring computer 7. It also sees in its database that the utility company calls radio modem 129408872 account 9,352,345.
7. Using a network connection 22, it passes the meter reading data to both the billing computer 8 and the network monitoring computer 7 and indicates that the data came from meter 9,352,345. The billing computer 7 can calculate the appropriate usage bill, and the network monitoring computer and analyze the data to see if there are any irregularities. Both of the utility company's computers associate the data with User Node Identification UNID 9,352,345, which was the meter's account number.

Another innovation of this invention that conserves bandwidth is a protocol developed by Applicants which they call "Stint" timing. Traditional over-the-air data protocols assign a fixed Time Division Multiple Access (TDMA) time interval and slot time to each device communicating on the system. The is excellent for voice, but in a data system, every message is often different size and priority. In a DART system, DART modems requesting bandwidth from the base station, so that they can begin sending data, first tell the base station 3 how much data they have to send.

When the base station 3 receives a request from a DART Modem 4 to send data, it analyzes the available radio bandwidth at its site, queries the server computer at Master Gateway about the quality of service the requesting DART modem is allowed to have, and then computes an efficient "Stint" allocation to give to the DART modem, and which channel the DART modem should use to transmit its data. The DART base station computer (BSC) assigns bandwidth in a unit of "ticks", which are fixed at 1 millisecond for communication channels up to 19200 bps. The following new terms are used to refer to tick-based TDMA systems:

Annum: The number of ticks before the tick count is reset to 0.

TimeSpan: A contiguous set of ticks.

Figure 10:
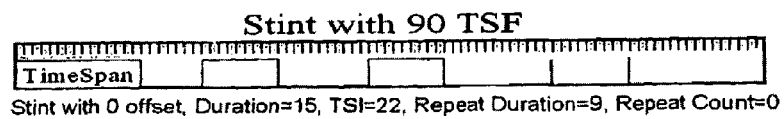
FIG. 10 is a drawing describing a typical Stint packet.

Stint: A periodically repeating set of TimeSpans, with a potentially longer initial TimeSpan. (A drawing describing a Stint with a 90 TSF is shown in FIG. 10.)

The advantage of a Stint over a traditional TDMA time allocation is the first time span can be any duration. The repetitive bandwidth can be optimized dynamically based on the quality of service, available bandwidth, bit-error-rate, and amount of data to be sent. In this example, the meter needed to send a small message of its current reading. It may have been only 8 bytes of information. When base station 3 received the request from DART modem 4 for an 8 byte data transmission, the base station quickly responded to DART modem 4 telling it to go ahead and send the 8 bytes in a stint beginning in 5 ms, with an initial time-span of 25 ms. The 25 ms is enough time to transmit the 8 bytes along with the HYPER packet header and some guard-band for the radio hardware to key and un-key the transmitter. In some implementations of DART, it is expected that very small transmission such as 8 bytes can be done without actually requesting a Stint allocation from the base station, but rather having the DART modem just go ahead and send the data. Larger amounts of data will require the stint allocation, and a traditional acknowledgement scheme is used to acknowledge each transmission to ensure reliable communications.

Unlike a traditional acknowledgements though, another bandwidth innovation is the inclusion of a subsequent stint with the acknowledgement message. When the base station sends an acknowledgement plus another stint allocation, the Dart modem receives that acknowledgement as well as additional time allocation to send more data. By doing this in one transmission, additional bandwidth is saved.

GPS Tracking

Figure 6:
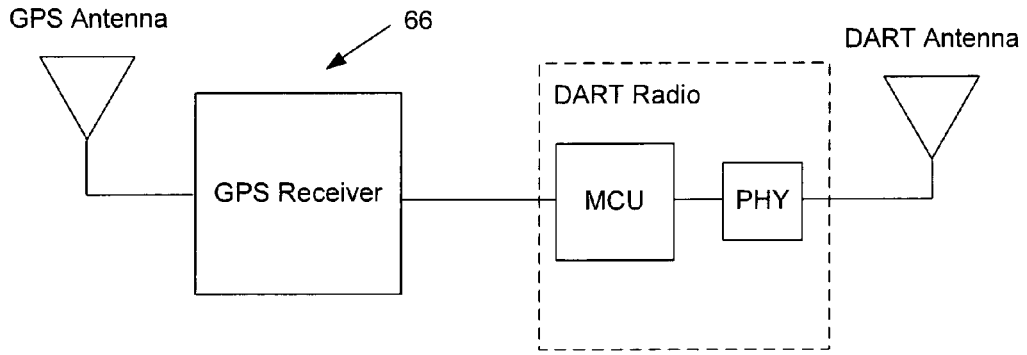
FIGS. 6, 7, 8 and 9 illustrate a preferred GPS tracking embodiment.
Figure 7:
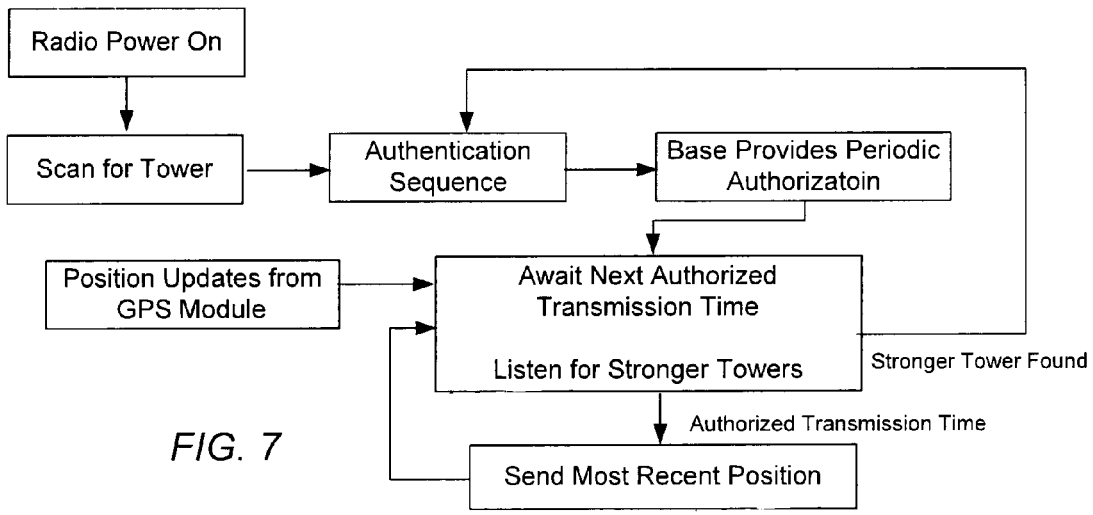

DART may be used to enable GPS tracking over an area as small as single-tower coverage and as large as a continent. The network may be used for tracking only or may coexist with other applications on the same network. The addition of GPS data to the DART modem is straightforward as shown in FIG. 6 with the GPS antenna and receiver shown at 66. In this arrangement, the GPS Receiver becomes the source of data to send on the DART network. Since GPS tracking, when it pertains to vehicles, required reliably periodic transmissions, DART's periodic bandwidth authorization is used. The authorization is shown in FIG. 7. Once authorized no further requests are required from the DART modem to send GPS position. The base's authorization includes bandwidth allocations spaced at appropriate intervals for GPS tracking such as 5 seconds, 30 seconds or 60 seconds. The user can configure the authorized transmission time on a per-unit basis. In this way, thousands or hundreds of thousands of assets may be tracked from a single tower. A minimum GPS tracking message contains just latitude and longitude, although most used in practice contain speed and heading information, elevation, and status information. If a 14-byte GPS tracking message is used at 4800 baud, for instance, with 60 second updates, then the absolute maximum tracked vehicles on a channel reserved for tracking only is:

$$60 \text{ s} * \frac{4800 \text{ bps}}{(\text{Protocol Overhead} + 14 \text{ bytes})} =$$

$$60 \text{ s} * \frac{4800 \text{ bps}}{(66 \text{ bits} + 112 \text{ bits})} = 1617 \text{ vehicles}$$

Figure 8:
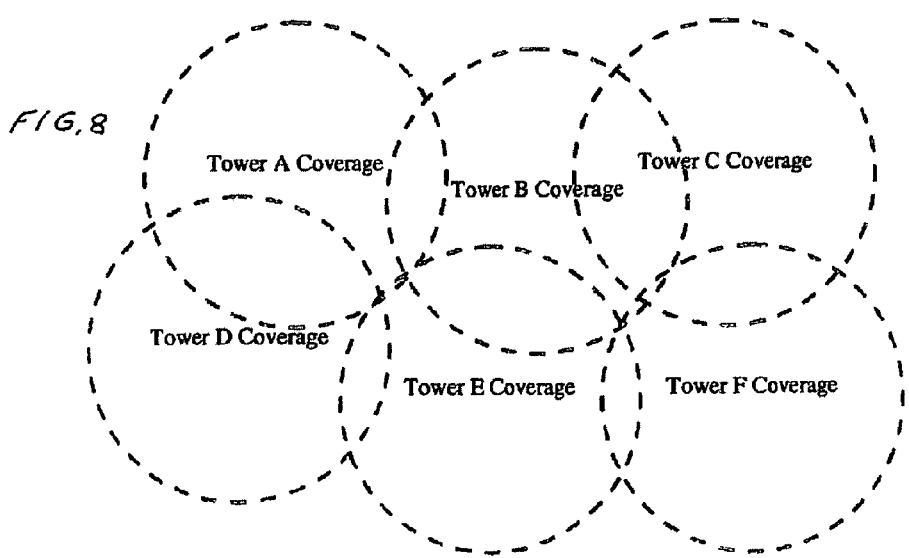
Figure 9:
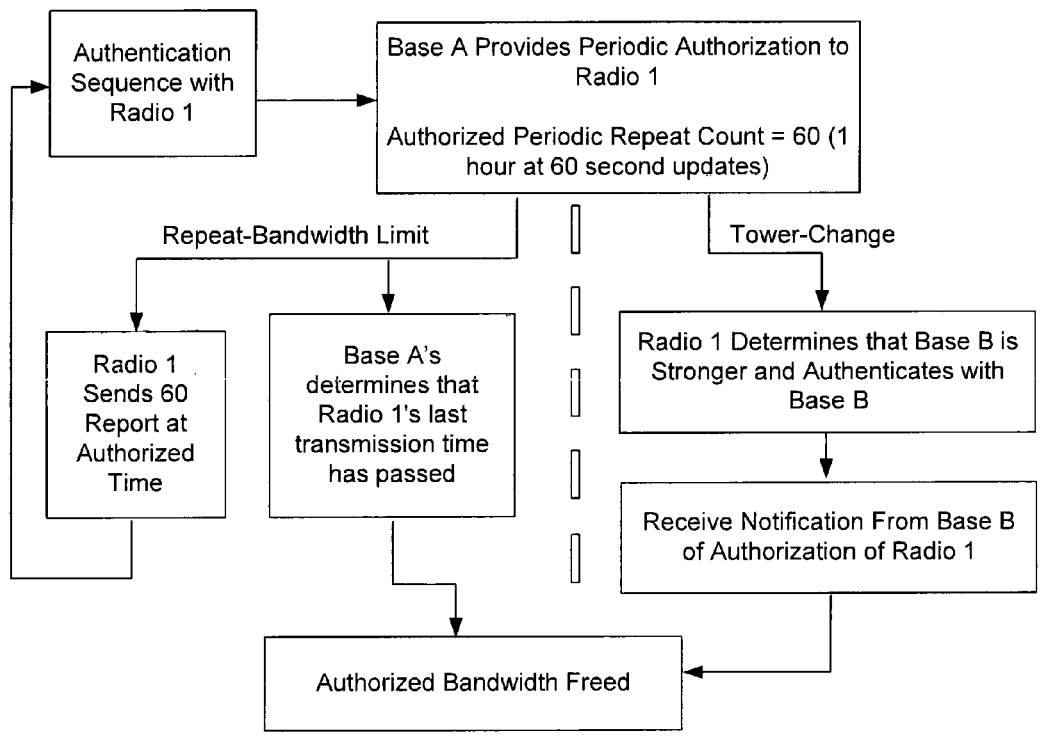

With 10 channels reserved for tracking, this allows for over 16,000 tracked vehicles at any one time on a single tower. The network plan includes one or more towers, arranged to maximize coverage, while adapting to the realities of terrain. Six towers are shown in FIG. 8 covering six overlapping regions. For a system operating over a large region, it is important to re-use bandwidth as the vehicles move around or are disabled. This is provisioned in DART through a limit on repeat-bandwidth and tower-change notifications. The lifetime of the authorized bandwidth is set by which of these occurs first. This is illustrated in FIG. 9 using a two-tower Base A and Base B example. In the repeat-bandwidth case, it is not necessary to hear the radio send its last report (or any reports) to free its bandwidth. This ensures that the bandwidth is freed regardless of circumstances such as power loss. Using this scheme, the radios may be tracked continuously over the region and more radios can be tracked simultaneously as compared to a single tower.

Vending Machine Operation Using DART and HYPER Technology

Additional advantages of the present invention become apparent with the description of how to implement this invention in a real-world application such as vending machine operation. The advantages and innovations in the previous description of "Meter Reading" all apply to the vending machine reading application.

Figure 5:
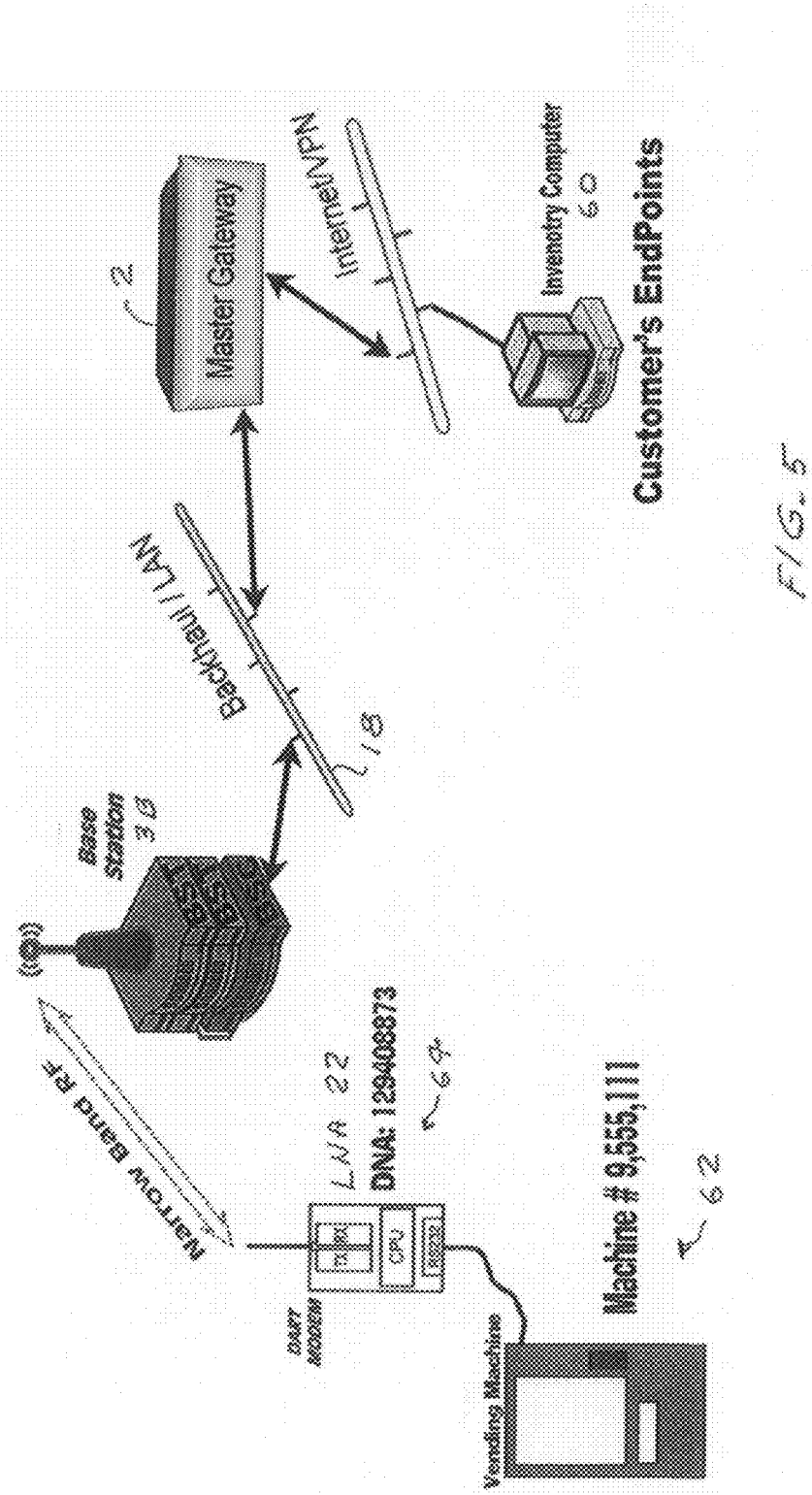
FIG. 5 describes a vending machine operation embodiment of the present invention.

FIG. 5 labeled: "DART Vending Machine Operation Example" shows how vending machines are operated utilizing the present invention. In some important ways the operation is very different from meter reading. In this example, the customer has and endpoint that is an inventory control system, monitoring the vending machines. The inventory computer 60 periodically sends a message to the vending machine, requesting its inventory status. Just like the meter reading example, the vending machine Number 9,555,111 shown at 62 is assigned a short LNA, such as 22 when its DART Modem 64 connects to the DART network. Over-the-air, the vending machine 9,555,111 will use LNA 22 to identify itself.

Vending machines commonly use a serial interface called DEX to transfer their inventory status to external devices. DEX information is typically 1000 to 10,000 bytes of information about each item in the machine, sales information, and shortages, and inventory count in the machine. For the inventory computer 60 to read the DEX data from the vending machine 62, it must send a query to the machine asking the machine to report its DEX information. In many cases, the vending machine manufacturer or a third party will put another simple computer inside the vending machine to handle the DEX information transfer.

For the inventory computer 60 to read the DEX information, it passes the read-request server computer at Master Gateway 2. When the server computer at Master Gateway 2 determines which vending machine is to be read by either analyzing the desired destination identification of the message or different Internet protocol ports can be mapped to different vending machines. For example, LP ports 33000-34000 could be mapped to vending machines 9555000-9556000. Both techniques are implemented in the applicant's Master Gateway design. When the server computer at Master Gateway 2 receives the read-request data from the inventory computer, it looks up the DART Modem's DNA for the UNID specified by the inventory computer. In this example, the inventory computer 60 would specify it wants to read the machine with User Node Identification (UNID) Number 9,555,111, which is the identification the vending company assigned to that machine. The Master Gateway server computer sees that UNID 9,555,111 is actually connected to wireless device DNA 129408873 shown at 62. The server computer looks up DNA 129408873 in its database to find out which base station that DART modem with DNA 129408873 is currently associated with. It finds that base station 3B was the last one communicating with DNA 129408873, so it sends the read request message to base 3B telling it to forward the read request to DNA 129408873.

Base station 3B looks up the LNA for the wireless device with DNA 129408873. It sees that it has assigned DART Node Address (DNA) 129408873 a Local Node Address (LNA) of 22. It transmits the read request over the air, on the channel it assigned DART modem 129408873 to listen on. In the transmission, it specifies the destination of the message to be 22. DART modem 129408873 shown at 64 hears the read-request data message over the air sent to LNA 22.

It knows it is LNA 22, so it outputs the read-request data to the vending machines DEX interface.

The vending machine 62 receives the read-request, and begins to send the DEX data out its serial port to the DART Modem 64. If the data is very large, the machine maker may put in its own file-transport protocol to run on top of DART. That may increase reliability in very large files by adding additional checksums, CRCs, or message fragmentation. Regardless of the additional protocol, the DEX data is send from the vending machine, into the DART Modem.

The DART Modem 64 requests bandwidth from the base station 3B to send the data, and just as in the meter reading example, the base station allocates stints of data to the DART Modem to send the DEX vending inventory data. As base station 3B receives the data from the DART Modem with LNA 22, it forwards it to the Master Gateway indicating that it came from DART modem with DNA 129408873.

The server computer at Master Gateway receives the data from DART modem 64 (with DNA 129408873) looks up in its router table to determine where the data should be send. The server computer sees that the vending company assigned User Node Identification (UNID) 9,555,111 to DART Modem 64 (i.e. DNA 129408873) and it has an inventory computer 60 that should get the data. The Master Gateway routes the DEX data to the inventory computer 60 indicating it came from machine 9,555,111.

The vending company's inventory computer 60 analyzes the DEX data, and reports which vending machines need what stock and how much they need. The vending company's personnel are dispatched to the machine with the appropriate inventory.

Additional Details

Figure 5A:
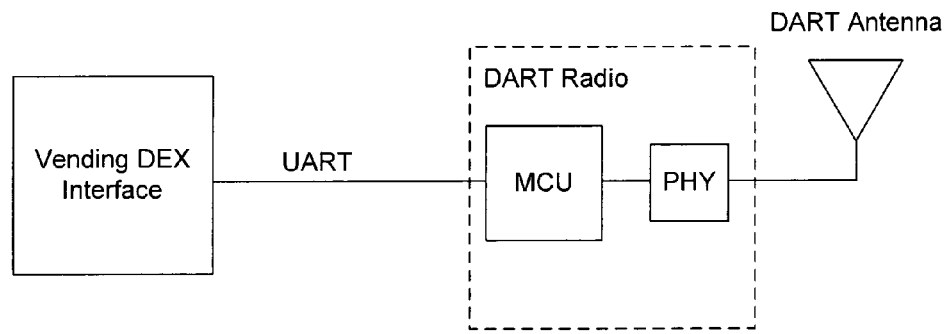
FIGS. 5A, 5B and 5C provide additional details of the vending machine embodiment
Figure 5B:
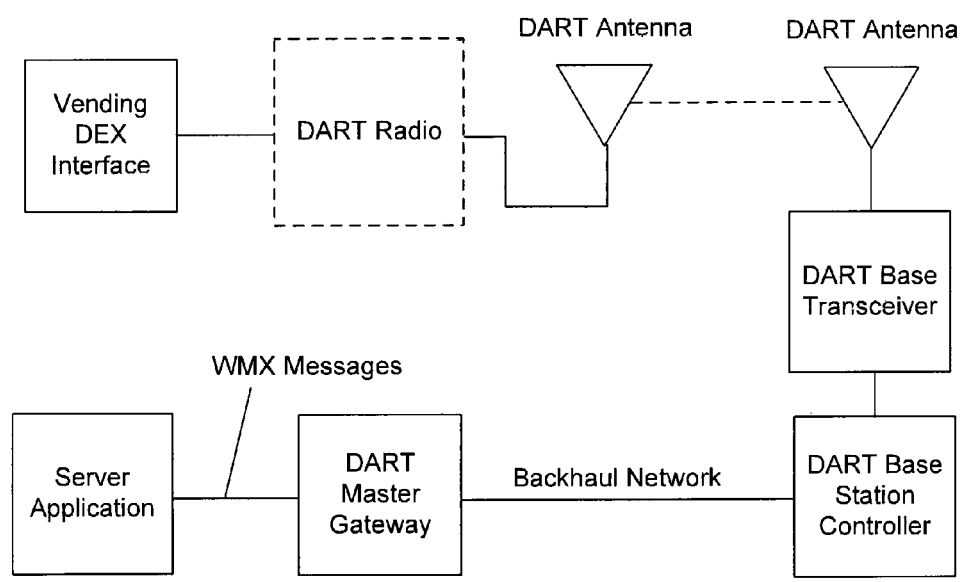
Figure 5C:
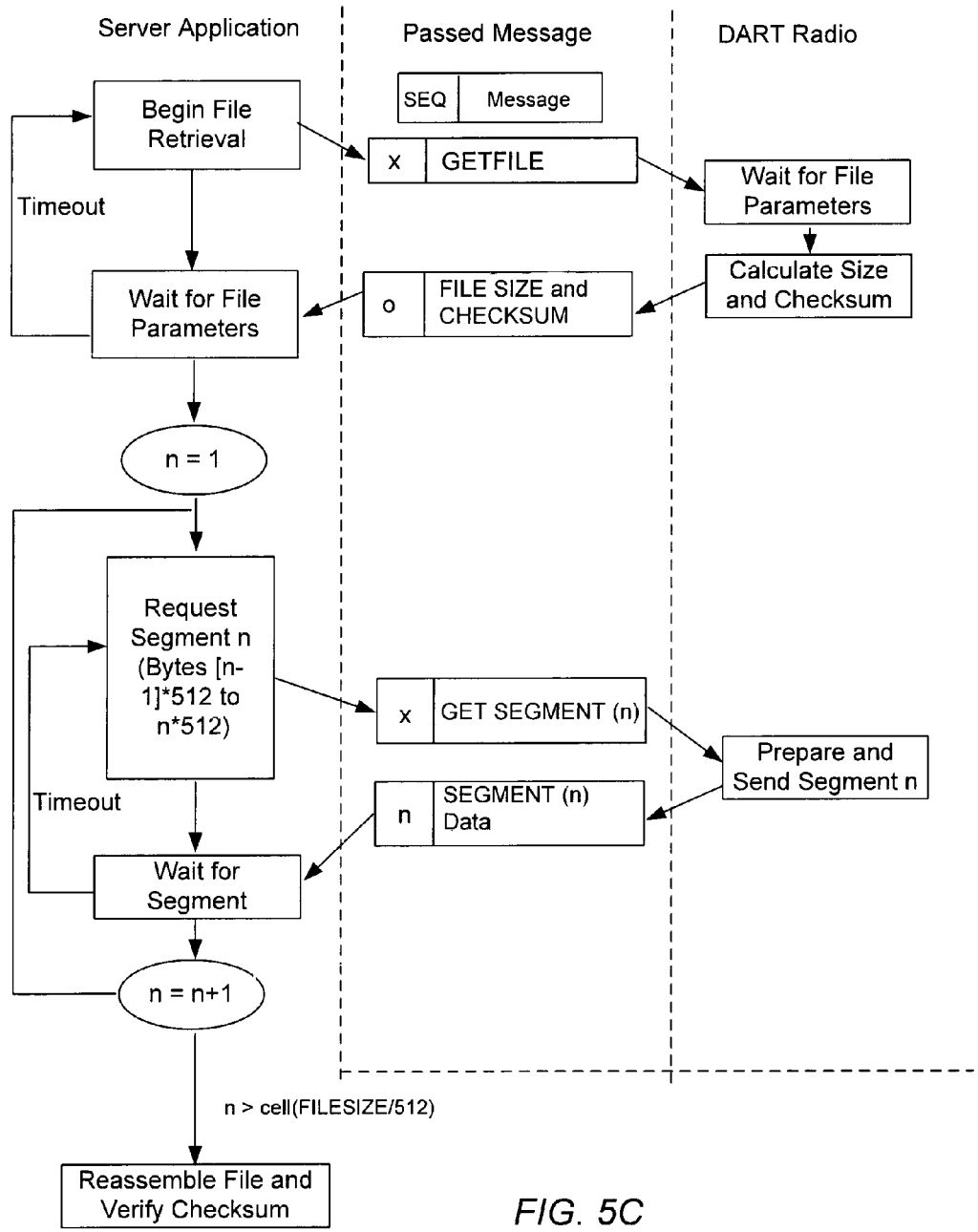

In this configuration, the DART modem connects to the vending machine interface as shown in FIG. 5A. The designer must implement the protocol within the MCU to download the file stored on the vending machine into local memory. Once in local memory, the MCU can either initiate the transfer of the file to a server or can wait for the server to request an updated file. In this embodiment, the server will request the file as desired. The transfer of the file moves through the DART network in this manner illustrated in FIG. 5B The specific protocol is implemented as shown in FIG. 5C making use of the DART layer for efficiency where possible (e.g., DART compresses message sequence numbers, so the file transfer protocol uses DART sequence numbers for numbering). Messages are passed between the. Server and the Master Gateway using WMX. The file is sent in 512 byte size segment to maximize efficiency on the DART network. The protocol could be adjusted to use smaller segments if desired. Individual checksum verification is not necessary since the DART network ensures that each segment is delivered either correctly or not at all. A checksum verification of the whole file is prudent, in case some mismatch of the states of either end caused a segment for a previous file to enter the data stream.

Other Important Applications

A few of the many applications of the present invention in addition to meter reading, GPS tracking and vending machine control are:

Alarm System. The modem could be connected to a burglar alarm or fire alarm, and when the alarm is triggered or must report status, the modem can send the alarm information to an endpoint. A computer monitoring system can periodically poll the alarm system through the wireless data to verify the alarm system is functional. Just some of the many other applications this technology can be used for are:

Remote control of lighting, irrigation systems, and power.

Home automation.

Mobile data communications with vehicles, and text displays in vehicles.

Personal communications, such as text messaging from wireless display devices.

Street sign text updating.

Wirelessly updating advertising displays.

Remote traffic monitoring.

Communicating with weather stations.

Positive train control.

Delivery service dispatch, tracking, updating, and communication.

Public safety officer and responder dispatch, monitoring, and GPS tracking.

Fire fighter tracking and emergency detection.

Theft detection of assets.

Tracking rental equipment for activity, theft, and usage.

Monitoring water tanks and water distribution systems.

Monitoring electricity and gas distribution systems.

Oil field supervision, control, and data acquisition. In-plant communications between machines and sensors in large industrial facilities.

Nurse-call systems to alert care-givers of personal care and critical needs.

Variations

Persons skilled in the wireless art will recognize that many embodiments of the present invention are possible in addition to the ones specifically mentioned above or described in detail. Therefore, the scope of the present invention should be determined by the appended claims and their legal equivalents.

What is claimed is:

1. An efficient wireless trunking system providing communication comprising:
A) at least one base station comprising:
 1) at least one antenna
 2) at least one radio transceiver system operating at plurality of center radio frequencies in the range of 200 kHz to 4,000 MHz and transmitting and receiving radio signals within a plurality of narrow band channels that are each no wider than 50 KHz;
 3) a base station controller comprising at least one base station computer;
B) a plurality information collecting modems, each of said plurality of information collecting modems having a factory installed device node address and comprising:
 1) a plurality of wireless transceiver units each comprising an information collecting unit and central processing unit for communicating wirelessly with the at least one base station at a plurality of center radio frequencies in the range of 200 kHz to 4,000 MHz and transmitting and receiving radio signals within a plurality of narrow band channels that are each no wider than 50 KHz,
 2) a central processing trait for processing and storing at least temporally a portion of the collected information;

C) a master communication facility comprising a master computer system,
  1) in communication with the at least one base station through a network connection and programmed to read and record information accumulated by the central processing units in the plurality of wireless transceiver units and
  2) also in communication with one or more users of information accumulated by the central processing units in the plurality of wireless transceiver units;
wherein the master computer system, the at least one base station computer, the information collecting unit and central processing unit are all programmed with special protocols designed for efficient communication of information through the narrow band channels among the users of the wireless trunking system, said protocols:
A) permitting users to assign a user node identification addresses to each of said wireless transceiver units requiring smaller header packets than the factory installed device node address,
B) providing node zero addressing in which a blank field in address packets are interpreted as zero thus reducing sizes of the address header packets, and
C) permitting the at least one base station computer to designate time allocations to the information collecting unit specifying how and when the information collecting-mags unit in each of the plurality of wireless transceivers is to transmit information to the at least one base station.

2. The wireless trunking system as in claim 1 wherein the base station controller is programmed to assign a local node address to at least one wireless transceiver unit of the plurality of wireless transceiver units providing smaller header packets than the factory installed device node address.

3. The wireless trunking system as in claim 1 wherein the base station controller is programmed to permit users assign a user node identification address to at least one wireless transceiver unit of the plurality of wireless transceiver units requiring smaller header packets than the factory installed device node address.

4. The wireless trunking system as in claim 1 wherein the base station controller is programmed to assign a user node identification address to at least one wireless transceiver unit of the plurality of wireless transceiver units requiring smaller header packets than the factory installed device node address thereby making dynamic identifications aspects of the system easy for the users to utilize.

5. The wireless trunking system as in claim 1 wherein the system is adapted for Global Positioning System tracking.

6. The wireless trunking system as in claim 1 wherein the system is adapted for meter reading.

7. The wireless trunking system as in claim 1 wherein the system is adapted for control of vending machines.

8. The wireless trunking system as in claim 1 wherein the system is adapted for one or more of the following applications:
  an alarm system,
  a remote control of lighting, irrigation systems, and power,
  home automation,
  mobile data communications with vehicles, and text displays in vehicles,
  personal communications, such as text messaging from wireless display devices,
  street sign text updating,
  wirelessly updating advertising displays,
  remote traffic monitoring,
  communicating with weather stations,
  positive train control,
  delivery service dispatch, tracking, updating, and communication,
  public safety officer and responder dispatch, monitoring, and Global Positioning System tracking,
  fire fighter tracking and emergency detection,
  theft detection of assets,
  tracking rental equipment for activity, theft, and usage,
  monitoring water tanks and water distribution systems,
  monitoring electricity and gas distribution systems,
  oil field supervision, control, and data acquisition, in-plant communications between machines and sensors in large industrial facilities,
  nurse-call systems to alert care-givers of personal care and critical needs.

9. The wireless trunking system as in claim 1 wherein the trunking system includes more than one base station.

10. The wireless trunking system as in claim 1, wherein the number of the base station is at least 2000 base stations.

11. The wireless trunking system as in claim 10 wherein the at least one base station operates at a narrow band radio channel between 12 kHz and 50 kHz.

12. The wireless trunking system as in claim 1 wherein the narrow band radio channel is 12.5 kHz.

13. The wireless trunking system as in claim 1 wherein the base station transceiver and the information collecting modem transceivers operate in frequencies between 896 MHz and 940 MHz.

14. The wireless trunking system as in claim 13 wherein the channel spacings are 12.5 kHz.

15. The wireless trunking system as in claim 1 wherein the system operates under a Federal Communication System license.

16. The wireless trunking system as in claim 1 wherein the system includes a plurality of base stations in a network wherein most of the base stations are located within 50 to 100 miles from adjacent base stations.

17. A method of efficiently operating a wireless signal trunking system comprising the steps of:
  A) providing at least one base station comprising:
    1) at least one antenna,
    2) at least one radio transceiver system operating at a plural center radio frequencies in the range of 200 kHz to 4,000 MHz and transmitting and receiving radio signals within a plurality of narrow band channel are each no wider than 50 KHz,
    3) a base station controller comprising at least one base station computer;
  B) providing a plurality information collecting modems, each of said plurality of information collecting modems having a factory installed device node address and comprising:
    1) a plurality of wireless transceiver units each comprising an information collecting unit and a central processing unit for communicating wirelessly with the at least one base station at plurality of center radio frequency, in the range of 200 kHz to 4,000 MHz and transmitting and receiving radio signals within a plurality of narrow band channels that are each no wider than 50 KHz,
    2) a central processing unit for processing and storing at least temporally a portion of the collected information;

C) providing a master communication facility comprising a master computer system,
  1) in communication with the at least one base station through a network connection and programmed to read and record information accumulated by the central processing units in the plurality of wireless transceiver units and
  2) also in communication with one or more users of information accumulated by the central processing units in the plurality of wireless transceiver units;
  wherein the master computer system, the at least one base station computer, the information collecting unit and the central processing unit are all programmed with special protocols designed for efficient communication of information through the narrow band channels among the users of the wireless trunking system, said protocols:
A) permitting users to assign a user node identification addresses to each of said wireless transceiver units requiring smaller header packets than the factory installed device node address,
B) providing node zero addressing in which a blank field in address packets are interpreted as zero thus reducing sizes of the address packets,
C) permitting the at least one base station computer to designate time allocations to the information collecting unit specifying how and when the information collecting unit in each of the plurality of wireless transceiver is to transmit information to the at least one base station.

18. The method as in claim 17 wherein the base station controller is programmed to assign a local node address to at least one wireless transceiver unit of the plurality of wireless transceiver units providing smaller header packets than the factory installed device node address.

19. The method as in claim 17 wherein the base station controller is programmed to permit users assign a user node identification address to at least one wireless transceiver unit of the plurality of wireless transceiver units requiring smaller header packets than the factory installed device node address.

20. The method as in claim 17 wherein the base station controller is programmed to assign a local node address to at least one wireless transceiver unit of the plurality of wireless transceiver units providing smaller header packets than the factory installed device node address.

21. The method as in claim 17 wherein the base station controller is programmed to assign a user node identification address to at least one wireless transceiver unit of the plurality of wireless transceiver units requiring smaller header packets than the factory installed device node address thereby making dynamic identifications aspects of the system easy for users to utilize.

22. The method as in claim 17 wherein the system is adapted for Global Positioning System tracking.

23. The method as in claim 17 wherein the system is adapted for meter reading.

24. The method as in claim 17 wherein the system is adapted for control of vending machines.

25. The method as in claim 17 wherein the system is adapted for one or more of the following applications:
  alarm system,
  remote control of lighting, irrigation systems, and power,
  home automation,
  mobile data communications with vehicles, and text displays in vehicles,
  personal communications, such as text messaging from wireless display devices,
  street sign text updating,
  wirelessly updating advertising displays,
  remote traffic monitoring,
  communicating with weather stations,
  positive train control,
  delivery service dispatch, tracking, updating, and communication,
  public safety officer and responder dispatch, monitoring, and Global Positioning System tracking,
  fire fighter tracking and emergency detection,
  theft detection of assets,
  tracking rental equipment for activity, theft, and usage,
  monitoring water tanks and water distribution systems,
  monitoring electricity and gas distribution systems,
  oil field supervision, control, and data acquisition, in-plant communications between machines and sensors in large industrial facilities,
  nurse-call systems to alert care-givers of personal care and critical needs.

26. The method as in claim 17 wherein the trunking system includes more than one base station.

27. The method as in claim 17 wherein the number of base stations is at least 2,000 base stations.

28. The method as in claim 17 wherein the at least one base station operates at a narrow band radio channel between 12 kHz and 50 kHz.

29. The method as in claim 17 wherein the narrow band radio channel is 12.5 kHz.

30. The method as in claim 17 wherein the base station transceiver and the information collecting modem transceivers operate in frequencies between 896 MHz and 940 MHz.

31. The method as in claim 17 wherein the channel spacings are 12.5 kHz.

32. The method as in claim 17 wherein the system operates under an Federal Communication Commission license.

33. The method as in claim 17 wherein the system includes a plurality of base stations in a network wherein most of the base stations are located within 50 to 100 miles from adjacent base stations.

\* \* \* \* \*